Patented May 18, 1948

2,441,853

UNITED STATES PATENT OFFICE 2,441,853

PHOSPHATE GLASS

John Edwin Stanworth, Sheffield, England, assignor to General Electric Company, a corporation of New York No Drawing. Application March 11, 1946, Serial No. 653,714. In Great Britain March 19, 1945

2 Claims. (Cl. 106—47)

My invention relates to glass compositions generally, and more particularly to soft glasses of high expansion coëfficient.

It is well known that soft silicate and borate glasses of high expansion coefficient have only poor chemical durability. The object of the present invention is to make soft glasses of high expansion coefficient, but good durability. I have discovered that this objective may be attained with certain compositions of soft phosphate glasses.

Glass compositions according to the invention lie within the following range of percentage composition by weight:

|  | Per cent |
|---|---|
| $P_2O_5$ | 28–38 |
| Alumina | 8–24 |
| Boric oxide | 0–20 |
| Lead oxide | 15–40 |
| Sodium+potassium oxide | 10–20 |

Sufficiently good durability can be obtained with the correct proportions of alumina and $P_2O_5$ without substantially increasing the softening point of the glass, provided the alumina content is not too high. The required high expansion coefficient and low softening temperature is obtained by using a substantial amount of alkali oxide. It is essential, of course, that the glasses should have a low tendency to devitrify so that they may be worked satisfactorily, and we have found that good glasses are obtained with the correct proportion of the constituents, and that boric oxide is particularly valuable from the point of view of obtaining resistance to devitrification.

I find that glasses with less than 5% boric oxide are not so easy to melt. I also find that glasses with high percentage of boric oxide may tend to bubble when sealed to metals and I therefore prefer boric oxide in the range 5–15%.

A particular application of the glasses is in making seals to copper; for glasses in the above range of compositions have expansion coefficients approaching that of copper. A preferred composition for copper sealing is as follows:

|  | Per cent |
|---|---|
| $P_2O_5$ | 33.5 |
| Alumina | 15.5 |
| Boric oxide | 7 |
| Lead oxide | 30 |
| Sodium oxide | 14 |

What I claim as new and desire to secure by Letters Patent of the United States is:

1. A glass of high expansion coefficient and good chemical durability having a composition as follows:

|  | Per cent |
|---|---|
| $P_2O_5$ | 28–38 |
| Alumina | 8–24 |
| Boric oxide | 5–15 |
| Lead oxide | 15–40 |
| Alkali oxide | 10–20 |

2. A glass of high expansion coefficient and good chemical durability having a composition approximately as follows:

|  | Per cent |
|---|---|
| $P_2O_5$ | 33.5 |
| Alumina | 15.5 |
| Boric oxide | 7 |
| Lead oxide | 30 |
| Sodium oxide | 14 |

JOHN EDWIN STANWORTH.

REFERENCES CITED

The following references are of record in the file of this patent:

UNITED STATES PATENTS

| Number | Name | Date |
|---|---|---|
| 1,964,629 | Grimm et al. | June 26, 1934 |